2,899,307
Patented Aug. 11, 1959

2,899,307
DRY STABLE FEED SUPPLEMENT

Alexander L. Wilson, Palos Park, Ill., assignor to Corn Products Company, a corporation of Delaware No Drawing. Application March 18, 1957
Serial No. 646,517

8 Claims. (Cl. 99—2)

This invention relates to a dry, stable feed supplement containing a high level of fat derived from raw soapstock as obtained from the alkaline refining of animal and vegetable fats and oils.

In recent years the value of high levels of fat in animal feeds has become recognized. Older sources of by-product fat have been tapped without filling the demand. New sources are needed. Requirements for this fat include reasonable palatability and stability against rancidity. It must have growth promoting value and freedom from toxic impurities, such as certain antioxidants. Furthermore it should be of low water content, both to prevent spoilage in shipment and to be blendable with other feed constituents without undesirable rise in finished feed moisture.

During the alkaline refining of glyceride fats and oils, such as cord oil, about 5 percent of lipid material is removed. These so-called oil foots are in the form of an aqueous emulsion comprising soaps of the free fatty acid which were initially present in the crude oil, phosphatides, glycerides, gums, pigments, proteins, other natural products, and an excess of the alkaline refining agent. It is universal practice to treat this stream, termed "alkaline soapstock," with sulfuric acid under rather severe conditions to hydrolyze the emulsion-promoting phosphatides, glycerides and proteins. By this means the water phase becomes separable with its water soluble impurities and there remains a dark, unpalatable oil phase composed essentially of free fatty acids and decomposition products. This is the "acidulated soapstock" of commerce, the name being derived from its customary use in soapmaking. Its availability at a low price has prompted recent trial of its value in animal feeding; however, the results have not proved too successful. It has also been proposed to convert the fatty acids in the acidulated soapstock to methyl esters and to recover them in distilled form as stable, palatable feed additives.

Alkaline soapstock has always appeared to have properties preventing its direct use in feed. Its content of up to 50 percent or more of water is unattractive for storage, shipment or direct application to feeds. I have noted difficulties in attempted drying: it foams severely during heating, and its ash content precipitates and clogs the evaporator. Hydrolysis also occurs with evolution of ammonia. With or without drying, its content of soap and of excess alkali makes the mixture unpalatable. Simply to neutralize alkaline soapstock with sulfuric acid does not permit useful phase separation nor obviate the foam or salt deposition problem occurring during evaporation. The resulting content of sodium sulfate is undesirable in feed. Hydrochloric acid neutralization produces the more acceptable sodium chloride, but again, technical problems in separation or evaporation seem unsurmountable. The cost alone of neutralization, due to the large acid requirement, is considerable.

It is an object of the present invention to provide a feed supplement containing a high level of fat. It is a further object to convert alkalin soapstocks, as obtained in the alkaline refining of animal and vegetable fats and oils, to a form adaptable for animal feeding. Another object is to provide a fat-containing feed supplement in dry form which is stable, palatable and nutritious. Still another object is to accomplish these results by very practical and economic means. Other objects will appear hereinafter.

I have found that by neutralizing a mixture of wet alkaline soapstock with an acidic fermentation liquor, absorbing the combination into a fibrous carrier and drying the thus obtained mixture, I obtain a novel and useful feed supplement in stable, attractive form. This supplement will have a pH of about 5 to 8 and may contain as much as 30 percent of fat, dry basis.

Various acidic fermentation liquors are suitable for my invention such as distillers' slop or the liquor obtained during the wet milling of corn. Corn steep liquor as commonly produced contains the water solubles of corn in partially fermented form. On a dry basis it may comprise up to 50 percent protein material, up to 20 percent phytate salts and up to 30 percent lactic acid. For my use I prefer that it be highly fermented and of a pH of about 4 or less. Corn steep liquor has long been an acceptable animal feed constituent on a protein and energy basis alone, and it contains in addition special ash, vitamin, peptide and unidentified growth elements. Its acidity due to its lactic acid content is very important for my invention as it provides a means of neutralizing the alkalinity of the soapstock without any material cost or inorganic acid contamination. Thus, whether the alkali in the soapstock is derived from ammonia, sodium carbonate, or sodium hydroxide, the sodium or ammonium lactate formed has the initial carbohydrate feeding value of the lactic acid, and the total ash is in no way increased.

The fibrous carrier of my mixture is of a type acceptable in and currently found in animal feeds. It may typically be a vegetable meal cake from which the fat or oil has been expressed or extracted, preferably spent germ flake from cord or grain sorghum. It may also be a bran fraction of grain.

I have discovered that my three-component mixture has unforeseen properties and functions. When the alkaline soapstock and steep liquor are blended separately or concurrently, into the dry fibrous carrier, there is rapid absorption and no occurrence of the troublesome foaming that would accompany wet neutralization of alkaline soapstock. Furthermore, this mixture even at high fat and moisture levels becomes friable and is dried in a conventional manner without difficulty. Thus unexpectedly high levels of fat and steep liquor solubles are obtained in a dry, free-flowing form which has an attractive appearance and a pleasant odor and taste. Moreover quite unexpectedly this fat-containing composition, in spite of its high level of free fatty acid, is not rancid and has excellent stability against oxidative deterioration. This effect may be due to protection by the steep liquor constituents, or it may be due to natural stabilizers contained in the alkaline soapstock. It also may be due to the way in which the phosphatide-containing fat penetrates and is absorbed into the carrier.

Thus my product appears to retain all of the feeding values of the steep liquor and fibrous vegetable carrier together with previously unexploited values in the alkaline soapstock. Among these are natural nitrogenous and carbohydrate substances, unhydrolyzed glycerides, various phosphatides, and numerous other lipids. I also avoid the reagent and treating expense ordinarily employed in the acidulation process, and the material losses involved both chemically and mechanically therein.

In carrying out the process of my invention, heavy steep liquor (about 45 to 70 percent moisture content), alkaline soapstock (about 40 to 60 percent moisture content) and a fibrous carrier, e.g. spent germ flake, are blended at a temperature of about 120° to 210° F. Although the order of mixing is not critical, a preferred method is to place the fibrous carrier in a blender at 180° F., and add preheated steep liquor and alkaline soapstock concurrently and in controlled proportions while blending. Heating is continued for about 5 minutes or until all liquid is well absorbed. The friable mixture thus obtained is then dried in a conventional manner until the moisture content is about 2 to 12 percent.

The final product may contain as much as 30 percent of fat, dry basis, and will have a pH between about 5 and 8.

In order to obtain a product having a 30 percent fat level, the initial mixture should contain about 35 percent of alkaline soapstock on a dry basis. This amount will vary somewhat depending on the composition of the soapstock employed.

The amount of steep liquor and fibrous carrier required to obtain a product having the desired pH will vary within a small range depending upon the acidity of both the steep liquor and the fibrous carrier, and the alkalinity of the soapstock. Generally, the ratio of steep liquor to soapstock is from about 1:2 to 2:1, dry basis. The minimum of fibrous carrier is about 35 percent, dry basis.

Small additions of such carbohydrates as corn sugar molasses or cane sugar molasses may be practiced. These materials tend to improve the color, odor, and flavor of the final product.

Synthetic antioxidants may be employed in my invention although their use is not compulsary. The amount may vary according to the potency of the antioxidant and the amount permissible in the final product. A trace of sulfur dioxide is generally present in steep liquor prior to its concentration by evaporation. However, additional sulfur dioxide or inorganic sulfite added to steep liquor before its evaporation will improve the color of my composition. Small proportions of a soluble sulfite added to my composition prior to drying is another or alternate means for obtaining a light colored product. Various other additives may also be incorporated in my composition, such as vitamins and minerals.

The following examples will further illustrate the invention and are to be considered for such purposes only and not in any sense limiting the invention.

*Example 1*

Alkaline soapstock obtained from the alkaline refining of corn oil was blended with sufficient incubated heavy steep liquor to neutralize the mixture to pH 7.0. This mixture was absorbed on spent germ flakes and dried in a rotary dryer. The following amounts were employed:

50 g. soapstock (40 percent moisture)
100 g. heavy steep liquor (50 percent moisture)
50 g. spent germ flakes The dried product had a pleasant odor and was free flowing. By analysis it was shown to contain 11.1 percent moisture, 26.3 percent protein (as is), and 18.0 percent fat.

*Example 2*

Fatted feeds containing about 20 percent fat on a dry basis were prepared by blending and drying alkaline soapstock, steep liquor and spent germ flake under various conditions. Soapstock constituted 25 percent of the mixture, steep liquor 35 to 40 percent, and spent germ flake 40 to 35 percent, all on dry bases. The soapstock was used at 40 percent moisture; the steep liquor at 48 and 68 percent moisture.

The wet mixtures prepared with 68 percent moisture steep liquor blended well and became friable at 160–180° F. The wet mixtures prepared with the more concentrated steep liquor required blending at steam temperatures for satisfactory absorption of constituents. However, all other compositions dried well to form stable products.

The ingredients could be blended in several manners. The two liquid ingredients could first be mixed in proper proportions and then blended into the dry carrier. This method always gave considerable foam, and when the steep liquor was added to soapstock, there was, in addition, some volatilization of ammonia. It was preferred to add the steep liquor rapidly to the warm soapstock.

When blending was commenced with dry carrier in the mixing equipment, no foaming occurred. If the order of mixing was spent germ flake, alkaline soapstock and steep liquor, absorption was slow. If the order was spent germ flake, steep liquor and alkaline soapstock, again there was ammonia loss. A preferred method was to run soapstock and steep liquor simultaneously into spent germ flake.

The following were employed in a typical example:

Spent germ flake _____ 125 g. (120 g., dry basis).
Steep liquor _____ 200 g. (105 g., dry basis).
Alkaline soapstock _____ 140 g. ( 75 g., dry basis).

The steep liquor and soapstock were separately heated to 160–180° for fluidization. The spent flakes were placed in a steam-jacketed Hobart mixer and agitated until warm. Under continued agitation, the warm steep liquor and soapstock were added simultaneously over a period of about 2 minutes. There was rapid absorption and no foaming. After 4 minutes of agitation under heat, the blend granulated to a form very satisfactory for kiln drying.

*Example 3*

The soapstock content of the product was varied to determine the maximum of fat content that could reasonably be produced. The general procedure for preparation of these fatted feeds was as follows:

Steep liquor was added to soapstock in the desired proportions and blended in the Hobart mixer with application of heat (140° F.). After a few minutes, spent germ was added and mixing and heating were continued for about 5 minutes. The product was then dried in the rotary dryer with input air heated to 375 to 400° F. Product was considered to be dry when outlet temperature was about 230° F. Moisture was determined by the Karl Fischer method.

Products of varying fat content are shown below. All were relatively easy to prepare except the one with 40 percent soapstock which could not be dried. Apparently about 35 percent represents the upper limit for soapstock content in the wet mixture, corresponding to about 30 percent fat in the final product.

| Ingredient Ratios, Percent D.B. | | | Moisture in Wet mix, Percent | Product | | |
|---|---|---|---|---|---|---|
| Soapstock | Steep liquor | Spent Flake | | pH | Fat, Percent D.B. | Protein, Percent D.B. |
| 0 | 50 | 50 | 31.5 | 4.0 | 3.0 | 36.6 |
| 10 | 50 | 40 | 34.8 | 4.4 | 10.4 | 33.4 |
| 20 | 40 | 40 | 34.0 | 6.0 | 18.8 | 28.8 |
| 25 | 35 | 40 | 34.1 | 7.0 | 21.3 | 27.5 |
| 30 | 30 | 40 | 34.0 | 8.0 | 26.5 | 24.9 |
| 40 | 30 | 30 | 37.0 | Too pasty to dry | | |

Moisture contents were as follows: soapstock, 43.5 percent, steep liquor, 46.1 percent, spent flake, 6.2 percent, product, 2.1 to 4.3 percent.

*Example 4*

Additional products were prepared according to the general procedure of Example 3 and using 10 percent of soapstock in the formulation. From the results below, it is seen that about 25 percent steep liquor gives the most acceptable color.

| Ingredient Ratios, percent D.B. | | | Product | | | |
|---|---|---|---|---|---|---|
| Soap stock | Steep liquor | Spent Germ | pH | Fat, percent D.B. | Protein, percent D.B. | Color |
| 10 | 10 | 80 | 6.5 | 9.8 | 25.0 | White. |
| 10 | 20 | 70 | 5.5 | 9.8 | 27.0 | Lt. yellow. |
| 10 | 25 | 65 | 5.3 | 9.9 | 30.0 | Golden-brown. |
| 10 | 30 | 60 | 4.9 | 10.0 | 30.0 | Dark yellow-brown. |

*Example 5*

Products were prepared according to the general procedure of Example 3 but with the addition of corn molasses to the steep liquor in various amounts. The products shown below were of excellent color, odor, and flavor.

| Ingredient Ratios, percent D.B. | | | | Product | | |
|---|---|---|---|---|---|---|
| Soap-stock | Steep liquor | Spent Flake | Mo-lasses | Fat, percent D.B. | Protein, percent D.B. | Color |
| 10 | 10 | 70 | 10 | 9.8 | 25.0 | Golden-brown. |
| 30 | 30 | 30 | 10 | 29.3 | 24.0 | Do. |
| 25 | 30 | 30 | 15 | 23.9 | 24.6 | Do. |
| 30 | 25 | 30 | 15 | 26.3 | 21.8 | Do. |
| 25 | 25 | 30 | 20 | 24.3 | 21.8 | Do. |

*Example 6*

To determine the tendency for fatted feed to cake upon storage, two batches were prepared in accordance with the general procedure set forth in Example 3. One of these batches was prepared with 20 percent soapstock and the other with 26 percent. Samples were taken from each batch at the wet stage and dried to various moisture levels. Samples of the same weight were tested for 48 hours in cylinders at 120° F. under 6 pounds of pressure. The extent to which the product compressed, and the pressure required to fracture the cake were considered to measure caking potential on storage. The data below, indicate high storage stability at moisture contents up to about 6 percent.

| Product Moisture, Percent | Soapstock, 26 percent, D.B. | | Soapstock, 20 percent, D.B. | |
|---|---|---|---|---|
| | Cake Height, mm. | Break Point, lb. | Cake Height, mm. | Break Point, lb. |
| 12 | 16 | 55 | 28 | 13 |
| 10 | 19 | 35 | 28 | 13 |
| 8 | 25 | 25 | 30 | 10 |
| 6 | 32 | 5 | 34 | 12 |
| 4 | 32 | 0 | 37 | 0 |
| 2 | 32 | 0 | | a FA | a FA = fell apart upon opening cylinder.

*Example 7*

The stability of the new products against oxidative deterioration was tested under storage conditions. The samples comprised preparations containing 40 percent spent flake and 20 to 30 percent fat. Periodically all were examined for rancidity by odor. The peroxide number of the extractible oil was recorded at the beginning of the test (zero for all) and again when rancidity was detected or at the conclusion of the test. The samples were stored in 4-ounce screw cap jars, with the lid loosely covering the jar, at a temperature of 60° C. for 6 months.

The results below indicate that these fatted products are quite stable against oxidation. Sodium bisulfite affords slight additional protection as do commercial inhibitors at permissible levels.

| Ingredient Ratios, Percent D.B. | | | pH | Moisture, Percent | Months to Rancidity | Peroxide No. |
|---|---|---|---|---|---|---|
| Soap-stock | Steep liquor | Spent Flake | | | | |
| 34 | 26 | 40 | 8.0 | 3.8 | 5 | 4.5 |
| 34 | 26 | a 40 | 8.0 | 4.3 | 6 | 1.2 |
| 34 | 26 | b 40 | 8.0 | 4.3 | 6 | 1.0 |
| 26 | 34 | 40 | 7.5 | 3.5 | 4 | 12.7 |
| 27 | 33 | 40 | 7.0 | 4.4 | 4 | 12.9 | a Commercial antioxidant containing 20 percent butylated hydroxyanisole, 20 percent butylated hydroxytoluene, and 60 percent vegetable oil (sold by Eastman Kodak Company under the trademark Tenox IV), 0.2 percent added before drying.
b Sodium bisulfite, 1 percent added before drying.

I claim:

1. A dry feed supplement having a high level of fat which is stable against oxidative deterioration comprising an admixture containing 10 to 35 percent of alkaline soapstock, 10 to 30 percent of acidic fermentation liquor and the balance fibrous carrier, all on dry basis, and having a pH between about 5 and 8.

2. A composition according to claim 1, having incorporated therein an antioxidant.

3. A composition according to claim 1, having incorporated therein a reducing agent.

4. A composition according to claim 1, having incorporated therein molasses.

5. A process for the preparation of a dry feed supplement having a high level of fat which is stable against oxidative deterioration which comprises blending alkaline soapstock, acidic fermentation liquor and a fibrous carrier at a temperature of about 120 to 210° F. and drying the thus obtained mixture; said mixture containing 10 to 35 percent of alkaline soapstock, 10 to 30 percent of acidic fermentation liquor and the balance fibrous carrier, all on dry basis, and having a pH between about 5 and 8.

6. A process according to claim 5, wherein an antioxidant is added to the mixture sometime prior to drying.

7. A process according to claim 5, wherein a reducing agent is added to the mixture sometime prior to drying.

8. A process according to claim 5, wherein molasses is added to the mixture sometime prior to drying.

References Cited in the file of this patent

UNITED STATES PATENTS

| 2,472,663 | Kleine | June 7, 1949 |
| 2,501,409 | Rosenberg | Mar. 21, 1950 |
| 2,504,159 | Singer et al. | Apr. 18, 1950 |
| 2,746,864 | Pack et al. | May 22, 1956 |

FOREIGN PATENTS

| 21,708 | Great Britain | 1912 |